(No Model.)

W. ERNST.
GRATE.

No. 323,031. Patented July 28, 1885.

WITNESSES:
Henry T. Drehert.
Louis H. Kuebler.

INVENTOR
Wilson Ernst
by his attorney
Chas. A. Rutter.

UNITED STATES PATENT OFFICE.

WILSON ERNST, OF CAMDEN, NEW JERSEY.

GRATE.

SPECIFICATION forming part of Letters Patent No. 323,031, dated July 28, 1885.

Application filed June 5, 1884. (No model.)

*To all whom it may concern:*

Be it known that I, WILSON ERNST, a citizen of the United States, and a resident of the city and county of Camden, and State of New Jersey, have invented a new and useful Improvement in Grates, of which the following is a specification.

The object of my invention is to furnish a shaking and dumping grate which will be simple in construction and operation, and at the same time very inexpensive.

Figure 1:
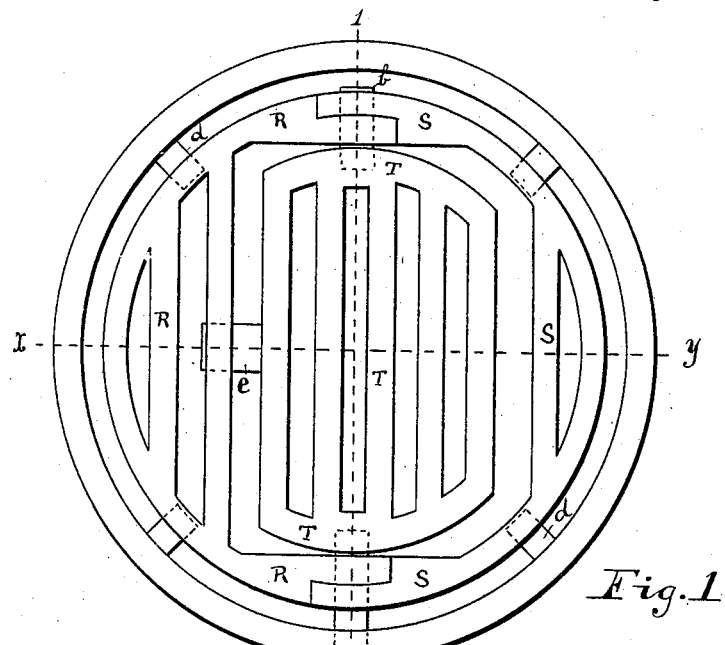
Figure 2:
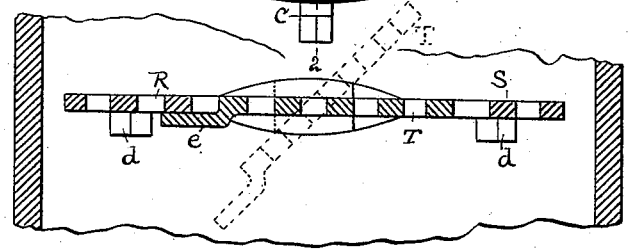
Figure 3:
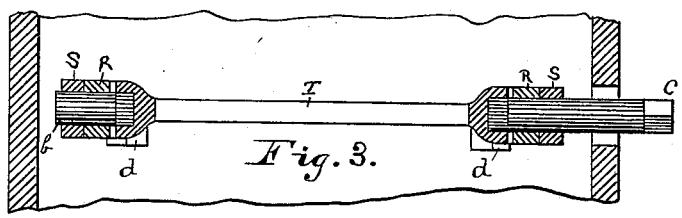
Figure 4:
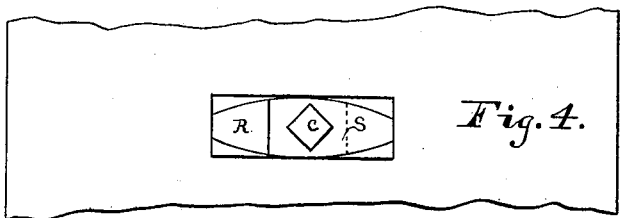

In the accompanying drawings, forming part of this specification, and in which similar letters of reference indicate like parts throughout the several views, Figure 1 is a plan of my grate; Fig. 2, a section on line $xy$ of Fig. 1; Fig. 3, a section on line 1 2 of Fig. 1; and Fig. 4, an end view of Fig. 1, showing squared end of pivot $c$ and door in furnace for operating grate.

My grate is constructed of three pieces, R and S being two semicircular castings, which form the outside, and T being a casting, which forms the middle of the grate. R and S are secured together by the pivots $b$ and $c$, upon which the central part, T, of the grate is hung. The arrangement of these pivots is shown in Fig. 3, which is a section of Fig. 1 on the line 1 2. They are firmly attached to the central part, T, and pass through holes in R and S and secure them together. R and S rest upon lugs or brackets $d$, cast in the cylinder of the stove, as shown, or upon any other convenient projection.

The center of the grate T is constructed as shown, being wider upon one side of the center line of the pivots $b$ $c$ than upon the other, and having upon its narrower side a finger, $e$, which bears against the bottom of one of the bars of R. This middle piece, T, will, owing to its construction, always keep its horizontal position.

When it is desired to dump the grate, a square socketed key is put over the squared end of $c$, and the grate is turned over, as shown by the dotted lines in Fig. 2.

When it is desired to shake the fire, the key is moved back and forth, and the whole grate is caused to move around in a horizontal plane on the lugs $d$.

Owing to the arrangement of the grate-bars, the fire may, if desired, be raked with an ordinary poker.

Having thus described my invention, I claim and desire to secure by Letters Patent—

The herein-described shaking and dumping grate, consisting of the pieces R, S, and T, R and S being secured together by the pivots $b$ $c$, and T being wider upon one side of the center line of the pivots $b$ $c$, upon which it is hung, than upon the other, and being furnished with a finger, $e$, the whole arranged and operating substantially as and for the purposes set forth.

WILSON ERNST.

Witnesses:
    CHAS. H. FELTON,
    T. F. BOARDMAN.